Oct. 28, 1930.　　　C. L. MURDEY　　　1,779,746
POULTRY FOUNTAIN
Filed March 13, 1928　　2 Sheets-Sheet 1
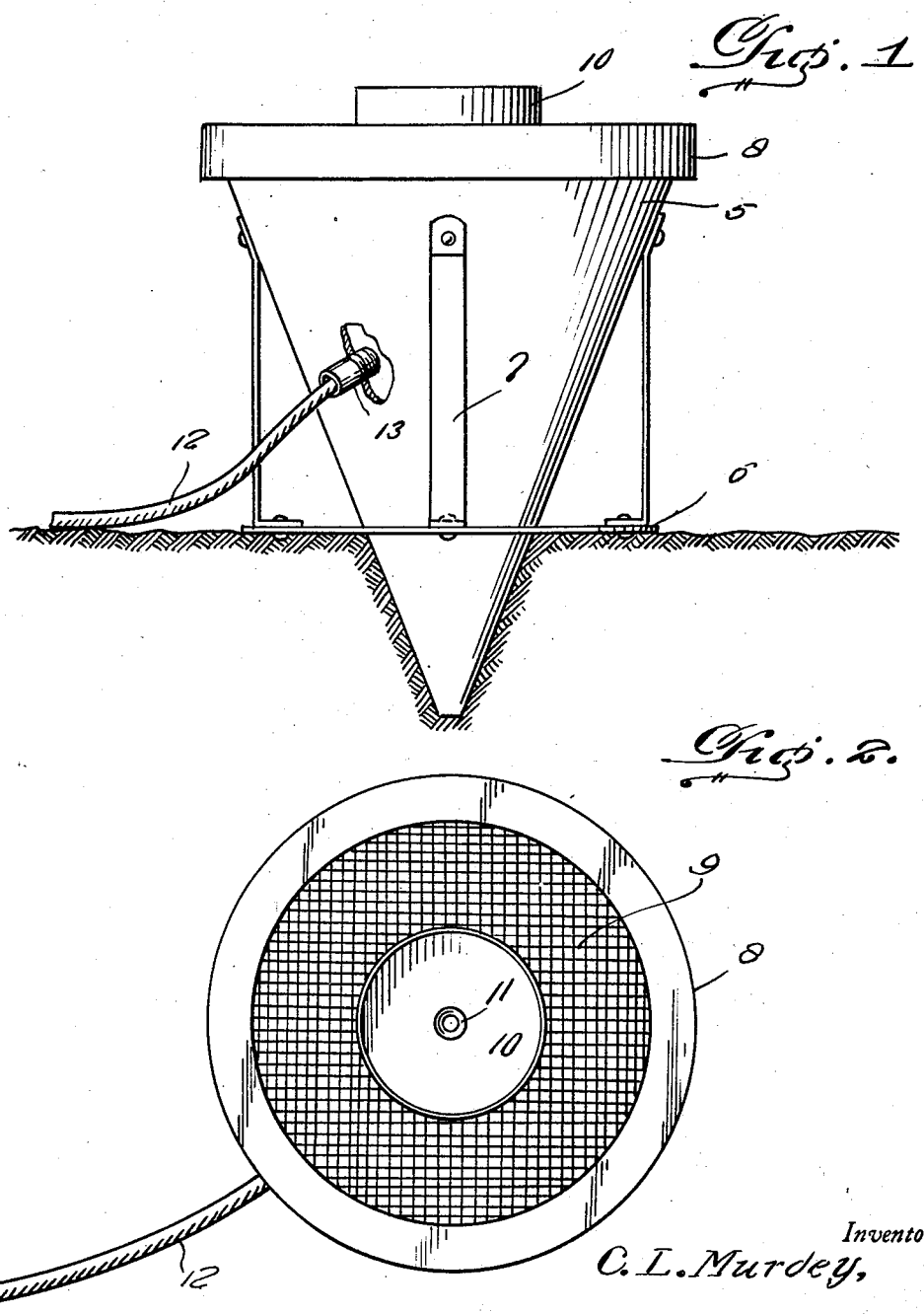
Inventor
C. L. Murdey,
By Clarence A. O'Brien
Attorney Oct. 28, 1930.   C. L. MURDEY   1,779,746
POULTRY FOUNTAIN
Filed March 13, 1928   2 Sheets-Sheet 2
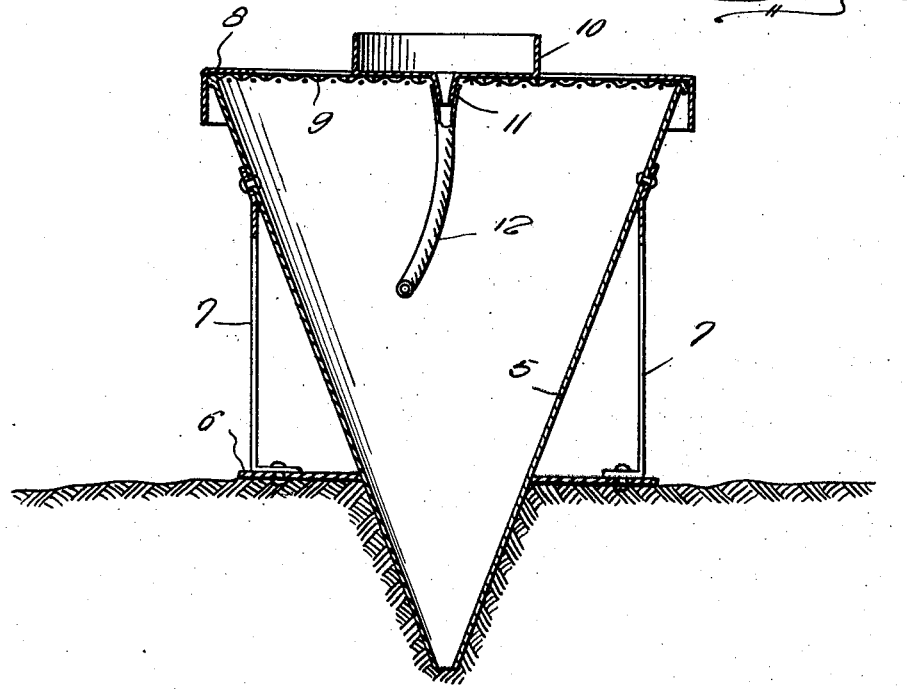
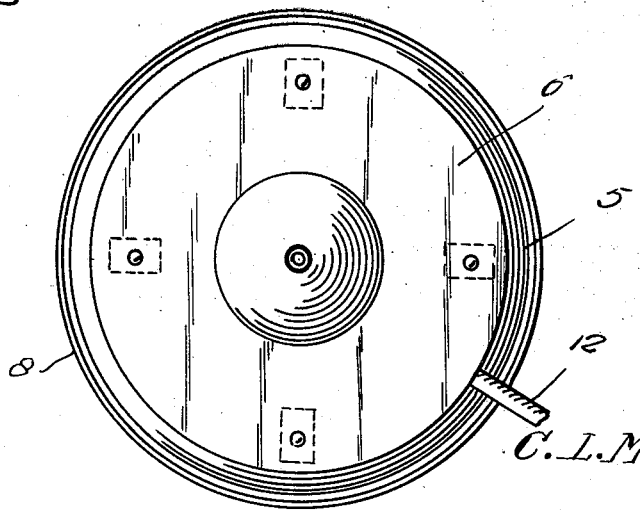
Inventor
C. L. Murdey
By Clarence A. O'Brien
Attorney Patented Oct. 28, 1930

1,779,746

UNITED STATES PATENT OFFICE

CLARENCE L. MURDEY, OF MOUNT VERNON, WASHINGTON

POULTRY FOUNTAIN

Application filed March 13, 1928. Serial No. 261,298.

This invention relates to new and useful improvements in poultry fountains and aims to provide an entirely novel simple and extremely useful fountain that may be readily disposed upon the ground and attached to a water supply so that a constant flow of water may be delivered to the fountain preventing the freezing of the water and to provide fresh water at all times and in a small but yet sufficient quantity.

An important object of the invention resides in the provision of a fountain for poultry that is of unusually simple and inexpensive construction the same consisting of but few parts and these combining with each other to provide a highly efficient fountain device.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

In the drawings:

Figure 1 is a side elevation of my improved poultry fountain,

Figure 2 is a top plan view thereof,

Figure 3 is a detail vertical section, and

Figure 4 is a bottom plan view.

Now having particular reference to the drawings my novel poultry fountain consists of a conical body 5 of sheet metal or other suitable inexpensive but durable material, the apex of said cone having an opening therein, said apex being adapted to be embedded in the earth surface as clearly disclosed in Figure 3. Arranged around this body 5 in spaced relation with the apexes thereof is a supporting plate 6 for engagement upon the surface of the earth for maintaining the conical body in correct perpendicular position. The plate 6 is connected to the body 5 directly beneath the upper end thereof by the metallic strap legs 7.

For disposition over the open upper end of the said body 5 is a lid consisting of a flanged metallic ring 8 and an insert 9 of wire screening.

At the center of the screen insert 9 and upon the top side thereof is a shallow water pan 10 the center of which is formed with a depending intake nipple 11 that projects through the screening into the interior of the body 5 and over which is arranged one end of a water conducting hose 12. This hose extends through a nipple 13 arranged within the conical body 5 above the supporting plate 6 from whence said hose leads to a supply faucet, not shown. Obviously when the water is turned on even very slowly there will always be a flow of water into the pan so that the poultry may at any time have a fresh drink. The water overflowing the pan 10 will pass into the body 5 and wash therefrom any dirt, filth or other foreign matter the same dripping to and seeping into the earth by reason of the engagement of the lower end of the body above or within the earth surface. By reason of the metallic ring 8 of the lid structure the poultry may perch thereon while drinking from the pan without any liability of having their feet coming entangled within the wire insert 9. As disclosed the said water pan 10 is of relatively shallow depth so as to avoid damage to the fowl's plumage.

It will thus be seen that I have provided a highly novel and extremely useful poultry fountain that is well adapted for the purpose heretofore designated.

Furthermore, even though I have disclosed the device as being arranged within the ground it is nevertheless to be understood that the device may be arranged within a chicken house and a hole provided within the floor of the house and the end of the body 5 arranged through the hole, the plate 6 supporting the body in perpendicular position.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. In a poultry fountain of the character described, a conical body open at its opposite ends and adapted to be projected at its apex through a supporting surface, a supporting member associated with the body above the lower end thereof and adapted for flush engagement with the said supporting surface, a lid for the open upper end of the body, said lid including a wire mesh insert, a water pan arranged within the center of the lid and having an inlet opening at the center thereof and a water supply pipe extending through an opening in the body and adapted for communication at its opposite end with the pan inlet.

2. In a poultry fountain of the character described, a conical body open at its opposite ends and adapted to be projected at its apex within the earth surface, a lid for the upper end of the body, said lid including a center insert of foraminous material, a water pan arranged upon the center of the lid, and means whereby a supply of water may be continuously introduced into said pan.

3. In a poultry fountain of the character described, a conical body open at its opposite ends and adapted to be projected at its apex within the earth surface, a lid for the upper end of the body, said lid including a center insert of foraminous material, a water pan arranged upon the center of the lid, and means whereby a supply of water may be continuously introduced into said pan, and means connected with the body adjacent the lower end thereof for engagement with the earth surface for supporting the body in perpendicular position when the latter is projected into the earth.

4. In a poultry fountain of the class described, an inverted conical body open at its respective ends, the apex portion thereof being adapted to project into the ground, a surface engaging ring encircling the apex portion of the conical body and being secured thereto for supporting said conical body in a perpendicular position, a flanged ring fitted over the upper edge of the conical body, a screen secured to said ring, a water pan arranged centrally on said screen, an inlet nipple extending from the bottom of said pan through the central portion of the screen, and a water supply pipe extending through the side of the conical body, and having connection at one end with said nipple for supplying water to the pan.

5. A poultry fountain of the class described, comprising a substantially inverted conical body open at its respective ends, the apex portion thereof being adapted to project downwardly into the ground, a ring encircling the apex portion of the conical body and adapted to engage with the surface of the ground to support the conical body in a perpendicular position, leg members attached at their lower ends to the outer edge portion of the ring and at their upper ends to the upper portion of the conical body, a flanged ring fitted over the upper edge of the conical body, a screen covering for the ring, a water pan arranged centrally on the top of the screen, an inlet nipple projecting downwardly from the bottom of the pan through the screen, and a water supply pipe extending through an opening formed in the side of the conical body, and having connection at one end with the inlet nipple for supplying water to the pan.

In testimony whereof I affix my signature.

CLARENCE L. MURDEY.